United States Patent
Karpovsky et al.

(10) Patent No.: US 11,936,669 B2
(45) Date of Patent: **\*Mar. 19, 2024**

(54) DETECTION OF ABNORMAL ENTITIES BASED ON SYNTACTIC GROUPING OF STRINGS PRELIMINARY CLASS

(71) Applicant: MICROSOFT TECHNOLOGY LICENSING, LLC, Redmond, WA (US)

(72) Inventors: Andrey Karpovsky, Haifa (IL); Tomer Rotstein, Haifa (IL); Fady Nasereldeen, Daliat el Carmel (IL); Naama Kraus, Haifa (IL); Roy Levin, Haifa (IL); Yotam Livny, Gadera (IL)

(73) Assignee: MICROSOFT TECHNOLOGY LICENSING, LLC, Redmond, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/937,826

(22) Filed: Oct. 4, 2022

(65) Prior Publication Data

US 2023/0028840 A1    Jan. 26, 2023

Related U.S. Application Data

(63) Continuation of application No. 16/866,411, filed on May 4, 2020, now Pat. No. 11,477,216.

(51) Int. Cl.
*H04L 9/40*    (2022.01)
*G06N 5/04*    (2023.01)
*G06N 20/00*    (2019.01)

(52) U.S. Cl.
CPC .......... *H04L 63/1416* (2013.01); *G06N 5/04* (2013.01); *G06N 20/00* (2019.01)

(58) Field of Classification Search
CPC ............ H04L 63/1416; H04L 63/1441; H04L 63/1433; G06N 5/04; G06N 20/00; G06F 16/90344
See application file for complete search history.

(56) References Cited

U.S. PATENT DOCUMENTS 11,477,216 B2 \* 10/2022 Karpovsky .............. G06N 5/04
11,610,580 B2 \* 3/2023 Freeman ............... G10L 15/183
11,762,714 B2 \* 9/2023 Bonnell ............... G06F 40/284
                                                          707/740

(Continued)

OTHER PUBLICATIONS

Zhong et al.; "Detecting Malicious Inputs of Web Application Parameters using Character Class Sequences", 2015, IEEE 39th Annual International Computers, Software & Applications Conference, pp. 525-532. (Year: 2015).\*

*Primary Examiner* — Matthew Smithers
(74) *Attorney, Agent, or Firm* — Han Gim; Newport IP, LLC

(57) ABSTRACT

Unauthorized use of user credentials in a network is detected. Data indicative of text strings being used to access resources in the network is accessed. Regex models are determined for the text strings. Troupings of the regex models are determined based on an optimization of a cumulative weighted function. A regex model having a cumulative weighted function that exceeds a predetermined threshold is identified. An alert is generated when the cumulative weighted function for the identified regex model exceeds the predetermined threshold.

20 Claims, 6 Drawing Sheets

(56) References Cited

U.S. PATENT DOCUMENTS

| | | | | |
|---|---|---|---|---|
| 2018/0332064 A1* | 11/2018 | Harris | ............... | G06F 15/16 |
| 2019/0354524 A1* | 11/2019 | Xu | ............... | G06F 16/2477 |
| 2021/0027167 A1* | 1/2021 | Goloubew | ............ | G06F 21/562 |
| 2021/0029013 A1* | 1/2021 | Cova | ............ | H04L 43/16 |
| 2021/0097168 A1* | 4/2021 | Patel | ............... | G06F 21/554 |
| 2021/0304013 A1* | 9/2021 | Zhang | ............... | G06N 5/01 |

* cited by examiner

| String | Single Model | Entropy | Coverage | Joint Model | Entropy | Coverage |
|---|---|---|---|---|---|---|
| andgar@gmail.com | [a-z]{6}@[a-z.]{9} | 70.9 | 1 | | | |
| daof@gmail.com | [a-z]{4}@[a-z.]{9} | 61.6 | 1 | [a-z]{4,9}@gmail.com | 42.3 | 3 |
| redkreym@gmail.com | [a-z]{8}@[a-z.]{9} | 80.4 | 1 | | | |
| 5441-f93nfb-0A0a@kf.se | [0-9]{4}-[a-z0-9]{6}-[a-zA-Z0-9]{4} | 68.1 | 1 | [0-9]{4}-[a-z0-9]{6}-[a-zA-Z0-9]{6} | | 1 |

[a-z] → 26 alpha characters
[0-9] → 10 numeric characters
4 = number of characters (daof)
6 = number of characters (andgar)
8 = number of characters (redkeym)
9 = number of characters (gmail.com)

FIG. 3

DETECTION OF ABNORMAL ENTITIES BASED ON SYNTACTIC GROUPING OF STRINGS PRELIMINARY CLASS

CROSS-REFERENCE TO RELATED APPLICATION

This application is a continuation of U.S. patent application Ser. No. 16/866,411, filed May 4, 2020, the content of which application is hereby expressly incorporated herein by reference in its entirety.

BACKGROUND

Computer networks are under constant threat from malicious parties seeking unauthorized access to the systems hosted thereon. The tactics used by malicious parties to attack networks and the tactics used by network administrators to defend against attacks are constantly evolving as the tactics are updated. New exploits are added to the arsenal of malicious parties and ineffective exploits are dropped. Implementing countermeasures, however, is often reactive, wherein network administrators must wait to identify the newest exploit before deploying a countermeasure and determining when to stop deploying a countermeasure when the corresponding exploit is no longer used. Correctly anticipating, identifying, and blocking the new exploits is crucial to maintaining security of a network.

It is with respect to these considerations and others that the disclosure made herein is presented.

SUMMARY

The disclosed embodiments describe technologies for automatically grouping short strings based on regex and detecting outliers. The technologies may be useful in a variety of situations where detection of outliers is desired. In one example, the technologies may be useful for protecting computing systems from an attack vector in which an attacker attempts to gain unauthorized access to resources by hacking credentials such as usernames and passwords. Various embodiments are disclosed for avoiding such attempts based on detection of suspicious usernames. This may allow networks and data centers to provide improved security, more effectively adhere to operational objectives, and improve operating efficiencies. The described techniques may also be used, for example, for detecting outliers in process names, hostnames, file names, and so forth, which can be useful in various contexts such as computing, information management (e.g., finding misclassified names of documents), and so forth.

More specifically, the disclosed embodiments may be used to detect outliers in a text string, in particular when the strings are structured in some way, such as in email addresses. When analyzing a group of strings, it may be desirable to determine if the strings were created by a common generation process, adhering to a defined (but unknown) naming convention. For example, when analyzing a group of usernames, it may be useful to determine the rules used in their creation, and whether there are outlier usernames that were generated using different rules which may indicate suspicious or malicious activity.

Attempts to determine string distance using common metrics, such as edit distance, may not be useful in this scenario, since the strings are typically too short and can have random substrings (e.g., GUIDs). Dictionary-based models may also not be suitable in this case since the dictionaries are specific to an environment (such as the owning company). However, the structure of the strings and the content of each substring are typically meaningful. The disclosed embodiments describe a platform that automatically generates a regex (regular expression or rational expression) for each string, and groups strings and generates group regex models by optimizing a function that is based on the entropy of a regex and its coverage.

In a security context, the disclosed embodiments can be used to detect names (e.g. usernames, application names, processes, etc.) that are created by a generation process previously unseen at that resource, and thus signifying a new type of access. The described embodiments can improve upon existing frameworks that attempt to detect a new or unknown name but generates a high false positive rate due to the flagging of benign cases (e.g., a new username from the same directory service (e.g., AAD), new iteration of a known process, etc.).

By providing the disclosed mechanism for identifying potential malicious attempts to access a system, loss of data and services may be avoided or mitigated, reducing downtime and impact to end users and providing for improved security and operational efficiency for computing networks and service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 3 is a diagram illustrating a data center in accordance with the present disclosure;

DETAILED DESCRIPTION

Figure 1:
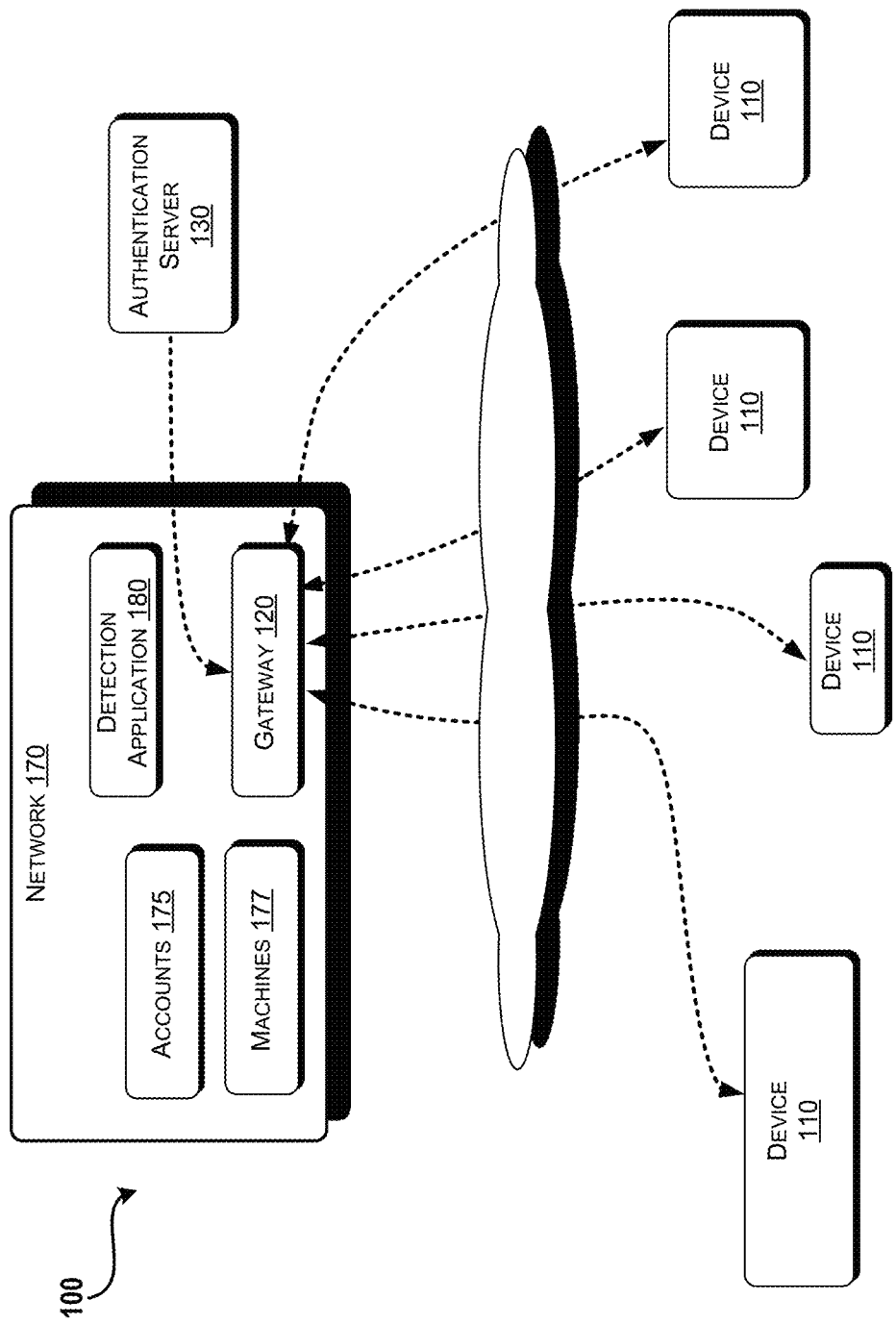
FIG. 1 is a diagram illustrating an example system implementing an authentication protocol in accordance with the present disclosure.

The following Detailed Description describes technologies for automatically grouping short strings based on regex and detecting outliers. The technologies may be useful in a variety of situations where detection of outliers is desired. In one example, detection of outliers may be useful for protecting user credentials in a computing environment by detecting a new attack vector in which an attacker attempts to gain unauthorized access to resources by hacking credentials such as usernames and passwords. The described techniques may be used to detect the use of suspicious usernames by detecting uses from sources that are unrecognized. The described techniques may also be used, for example, for detecting outliers in process names, hostnames, file names, and so forth, which can be useful in various contexts such as computing, information management (e.g., finding misclassified names of documents), and so forth. The disclosed embodiments provide for a new approach for automatic syntactic grouping of short strings. As an improvement to existing methods, the disclosed embodiments provide methods that are automatic, unsupervised, and allow for the detection of several common syntactic generators as well as rare (potentially anomalous) ones.

The disclosed techniques can be implemented in the cloud security context as a way to improve the accuracy of new entity detectors. Such detectors are a common security feature especially in cloud environments. Normally, the detectors are based on simple "new entity" logic, or monitor behavior exhibited by the new entity after initial access. These methods either have low accuracy, or require additional external data (such as entity behavior, or whitelists) and/or supervision. The disclosed techniques do not impose such requirements while improving the accuracy of detection.

There are several methods for syntactic grouping of strings. The most common methods are based on some definition of string distance (e.g., simple edit distance). A distance matrix is created for a group of strings, and then a clustering method is implemented in order to find groups of similar strings. However, this approach is not optimal in the security context (e.g., names of users, applications or processes accessing or running on a resource) for several reasons:

(1) The names are usually too short to allow calculation of meaningful distance metrics (2) The names commonly contain random substrings (such as GUIDs) or iterative indices, which are not recognized by common string distance metrics as similar (e.g. 'user_G56vp9' and 'user_4o0Pc4J').

Another common method is a dictionary-based approach, where a dictionary of legitimate 'words' is either known (for example, in case of a real language) or generated based on the corpus of commonly used terms. The dictionary is then used to reconstruct the used words and group them (for example, by semantic similarity of involved dictionary words). This approach is also not a good fit, since commonly used naming practices do not constitute a real and stable language, so using a pre-defined dictionary is not possible. Generating a common dictionary from used terms also do not work, since the terms are dynamic and environment-specific (e.g., 'sqladmin' is specific for SQL users, 'MSFT' has a meaning inside Microsoft, etc.). Furthermore, the number of existing names can be too small to create a stable dictionary.

However, the structure of the strings, as well as the content of each part of the string, are usually meaningful. For example, the usernames 'reader.11.BC5' and 'reader.23.GH5' are intuitively recognizable as similar, and very different from both 'john.reader@outlook.com' and 'r4dv4-dfr3-67gr'.

It would be useful to define a method that will group strings to syntactically similar groups and identify rare strings that are dissimilar to others, and that does not rely on any pre-defined domain knowledge or user input.

The present disclosure describes a way to automatically fit a regex individually for each string and group similar strings under common regex models. This may be done by defining a cumulative function for a group of strings, which is dependent on entropy (specificity) of the regexes and their coverage (number of fitting strings). By maximizing the cumulative function, the optimal list of regex models that describe the group of input strings can be determined. As used herein, the cumulative function may also be referred to as a cumulative gain function. Anomalous strings can then be detected by identifying strings that are not covered by common models. In the security context (e.g., usernames accessing a resource), such strings can be flagged as potentially suspicious or malicious.

Referring to the appended drawings, in which like numerals represent like elements throughout the several FIGURES, aspects of various technologies for detecting unauthorized certificates will be described. In the following detailed description, references are made to the accompanying drawings that form a part hereof, and which are shown by way of illustration specific configurations or examples.

FIG. 1 illustrates an example environment 100 in which authorization requests are handled by a system from various requesting devices. As illustrated, one or more devices 110 that are seeking authorization may attempt to gain access to accounts 175 or physical/virtual machines 177 hosted within the network 170. The devices 110 may connect to the network 170 via a gateway 120 which is in communication with the authentication server 130.

The authentication server 130 may be configured to handle the authorization or rejection of login attempts carried in authentication traffic. Although not illustrated, one of skill in the art will appreciate that various servers and intermediaries in a distributed network may be implemented between the devices 110 and the gateway 120 to route a message between the user and the network 170. As will also be appreciated, although some components of the example environment 100 are illustrated singly, in various aspects multiple copies of those components may be deployed, for example, for load balancing purposes, redundancy, or offering multiple services.

The devices 110 are illustrative of various computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIG. 9.

The devices 110 may be accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). For example, a malicious party may attempt to obtain a certificate for accessing restricted resources which may be done without the knowledge or consent of the devices' owners. In another example, devices 110 may be the computing devices used by a legitimate user seeking to access an account which may make one or more attempts to access the account.

The gateway 120 may be a hardware device, such as a network switch, or a software service that links the devices 110 from the external network (e.g., the Internet) to the authentication server 130 over the network 170 (e.g., an intranet). In various aspects, the gateway device 120 may provide a firewall and may regulate the flow of communications traffic into and out of the local network 170. The gateway 120 may be configured to forward messages to the authentication server 130 from the devices 110 (as well as other devices on the internal network).

The authentication server 130 may receive authorization requests from the devices 110 and determine whether to grant access to accounts served by the network 170. The authentication server 130 may be a physical machine or a virtual machine that handles the authentication requests for the network 170 and acts as a domain controller. The authentication server 130 may use various authentication protocols including, but not limited to, PAP (Password Authentication Protocol), CHAP (Challenge-Handshake Authentication Protocol), EAP (Extensible Authentication Protocol), Kerberos, or an AAA (Authentication, Authorization, Accounting) architecture protocol, to allow a user access to one or more systems within a network 170. Depending on the standards used, the number of protected systems in the network 170 and user account settings, the successful presentation of authentication parameters will grant the devices 110 access to one or more systems safeguarded by the authentication server 130 and at an appropriate permissions level for the associated user.

In an embodiment, the authentication server 130 may execute a detection application 180 that is configured to access network traffic to monitor authentication traffic over the gateway 120 destined for the authentication server 130 to determine profiles for the credentials being used and determine whether any of the communications represent an unauthorized use of user credentials. In some embodiments, the detection application 180 may be executed on a separate device with unique MAC and IP addresses from the other devices in the network 170 and receive copies of messages that are forwarded to the authentication server 130 from the gateway 120 via the Remote Network Monitoring (RMON) or Switch Monitoring (SMON) specifications, port mirroring, or similar forwarding scheme. In other aspects, the detection application 180 may intercept all network traffic bound for the authentication server 130 (either with the same MAC and IP address or unique addresses) or passively taps and listens to the transmission medium on which the communications are sent to the authentication server 130. In yet other aspects, the detection application 180 may execute on a virtual machine or as a process on the authentication server 130 and may thereby passively share communications received at the application server 130.

The entropy of a string may be defined as:

$$E = \log_2(R^L)$$

For a parsed string (e.g., cut on delimiters common for the context), the entropy becomes:

$$E = \log_2(R_1^{L_1} \cdot R_2^{L_2} \cdot \ldots \cdot R_k^{L_k})$$

Thus, more specific regex models have lower entropy, which is desired. However, more specific models fit a smaller number of individual strings—thus having a lower coverage (defined as the number of names covered by the regex model).

Entropy (string):

$$E = \log_2(R^L)$$

R=size of used character pool
L=length of string
So:

$$E(\text{'[a-zA-Z0-9.]\{8,16\}'}) = \log_2(63^{16}) = 95.6$$

$$E(\text{'[a-z]\{8\}@[a-z.]\{9\}'}) = \log_2(26^8 \cdot 27^9) = 80.4$$

$$E(\text{'[a-z]\{4,9\}@gmail.com'}) = \log_2(26^9 \cdot 1) = 42.3$$

$$E(\text{'osdgar@gmail.com'}) = \log_2(1) = 1$$

For a group of regex models (describing a group of input strings), a cumulative weighted function may be defined as a sum of weighted functions for each model.

$$\text{coverage} \propto \frac{1}{\text{entropy}}$$

$$\text{gain} = func(w_c \cdot \text{coverage}, w_e \cdot \text{entropy})$$

$$\text{model}' = \arg\left(\max\left(\sum \text{gain}\right)\right)$$

Figure 2:
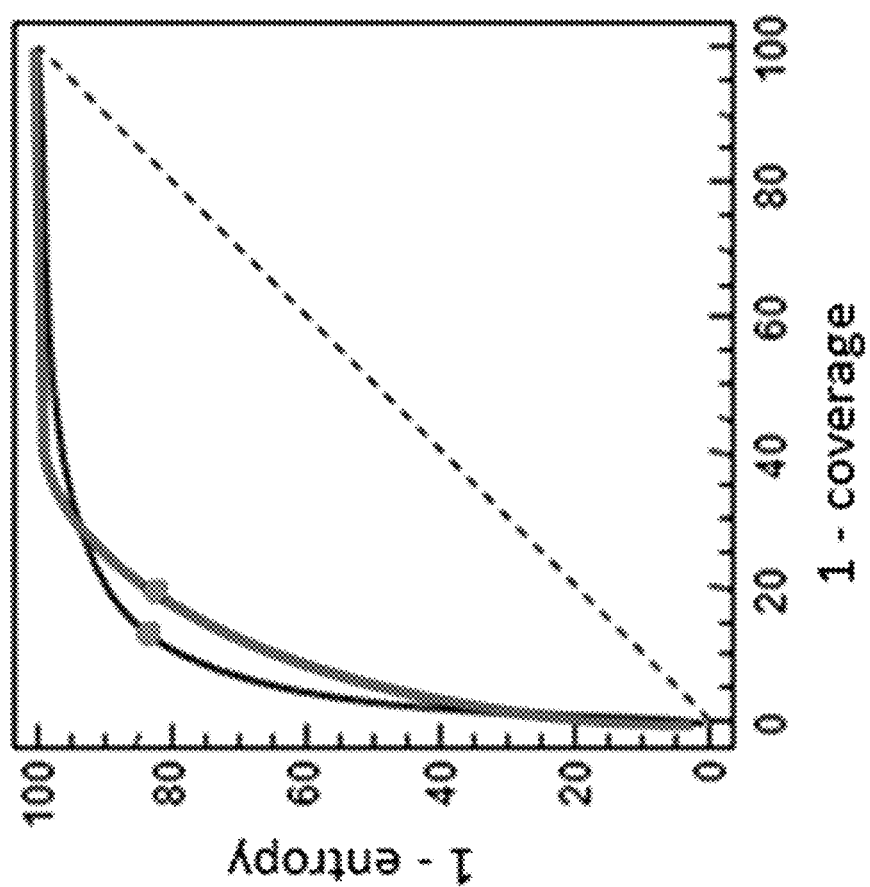
FIG. 2 is a diagram illustrating an example system implementing an authentication protocol in accordance with the present disclosure.

The optimal value of the cumulative weighted function is reached when balancing between low entropy and high coverage for a group of regex models generated for the list of input strings. Referring to FIG. 2, illustrated are examples of optimal values. The process may be automatic and unsupervised. The optimization can be tailored for a given environment by changing the weights of the function arguments.

Optimization can be achieved by various numeric methods. In one example, an iterative tree-based approach may be implemented, where most models with the most similar structure are joined at each step so that a common regex model (with higher coverage and entropy) is defined. If the overall gain is improved, the joined model may be retained, and the next join may be attempted. Otherwise, the current join may be disregarded and the next one may be attempted.

For example, with reference to FIG. 3, table 300 provides a list of strings representing usernames, three individual regex models can be fit, with an average entropy of 70.9 and a coverage of 1 (for each).

andbar@gmail.com [a-z]{6}@[a-z.]{9}
daof@gmail.com [a-z]{4}@[a-z.]{9}
redkreym@gmail.com [a-z]{8}@[a-z.]{9}

When a common regex '[a-z] {4, 9}@gmail.com' is built, it has an entropy of 42.3, and coverage of 3. Thus, in this case, the common regex is more useful than three individual ones. Referring to FIG. 3, the group of strings 310 can be seen as a grouping of email addresses with a common domain. The string 320 may be seen as a different grouping with a different string, being a username from a different source from a different origin. The described techniques can be used to determine that the grouping 310 has a similar structure, although the actual letters in the string can be different.

A number of alternative techniques for automatic generation of regex models for groups of strings may be implemented. Several major differences between the described embodiments and these techniques are detailed below:

(1) Method: the described embodiments provide an automatic regex detection framework that finds the optimal list of models that cover a group of input strings (in case where the strings are generated by any number of different generators), while other methods provide a single regex that optimally covers the whole group. The disclosed techniques thus allow for detection of anomalous names even for heterogenic generators.

(2) Implementation: The definition and usage of a cumulative weighted function allows for the use of an unsupervised and automatic approach, which enables the methods to be used as part of a feature monitoring significant amounts of cloud resources.

(3) Context: the disclosed embodiments may be adapted for use in the cloud security context and used for detection of anomalous and potentially suspicious names (such as usernames), thus improving currently available detectors in this area.

Specifically, in the security context, the described methods can be used to detect names of entities (such as usernames, applications, processes, etc.) that are accessing a resource (such as a server or storage account) created by a process previously unseen at that resource. This may be useful as a potential security alert, since such an entity may signify a new type of access with higher fidelity than simply detecting a new username. For example, such an access attempt may indicate an access via a dormant backdoor, or a new entity being created for persistent access. The disclosed techniques may allow for the detection of such attempts using automatic and unsupervised approaches while providing support for several syntactic models.

As used herein, a domain may be defined as an administrative unit corresponding to a security boundary. Computers in a domain may share physical proximity on a local area network (LAN) or may be located in different geographic parts of the world and communicate over various types of physical connections, including ISDN, fiber, Ethernet, Token Ring, frame relay, satellite, and leased lines, etc. Domain administrators typically create one user account for each user within a domain and the users log on to the domain rather than repeatedly logging on to various individual resources in the domain. In addition, a domain controller may control various aspects of the domain such as individual use of resources on the domain. The users may access resources in the domain subject to user rights, privileges and system-wide policies. There may be predefined (built-in) user groups with sets of assigned user rights and domain administrators may assign user rights by adding a user account to one of the predefined user groups or by creating a new group and assigning specific user rights to that user group. Users who are subsequently added to a user group may automatically gain all user rights assigned to that user group.

In an embodiment, an agent or application (referred to herein as "detection application") may be installed on domain controllers in a domain or other grouping of computing resources. The detection application may be configured to parse network traffic and identify usernames and other text strings of interest. The detection application may analyze strings in the manner described herein. Based on the analyzed strings, the detection application may identify potential misuse and generate an alert for responsive action.

The detection application may initially receive and track information during a time window. In some embodiments, a machine learning model may be implemented to detect unauthorized credentials. In some configurations, the machine learning model may be configured to utilize supervised, unsupervised, or reinforcement learning techniques to generate correlations. For example, the machine learning model may utilize supervised machine learning techniques by training on the collected credential data using feedback from users. In some embodiments, the machine learning model may also, or alternatively, utilize unsupervised machine learning techniques to determine correlations including, but not limited to, a clustering-based model, a forecasting-based model, a smoothing-based model, or another type of unsupervised machine learning model. In some embodiments, the machine learning model may also, or alternatively, utilize reinforcement learning techniques to generate results. For example, the model may be trained using the input data and, based on feedback, the model may be rewarded based on its output.

The time period during which the usernames are learned, and a baseline profile may be determined based on a time threshold or when the baseline profile is stabilized.

Figure 4:
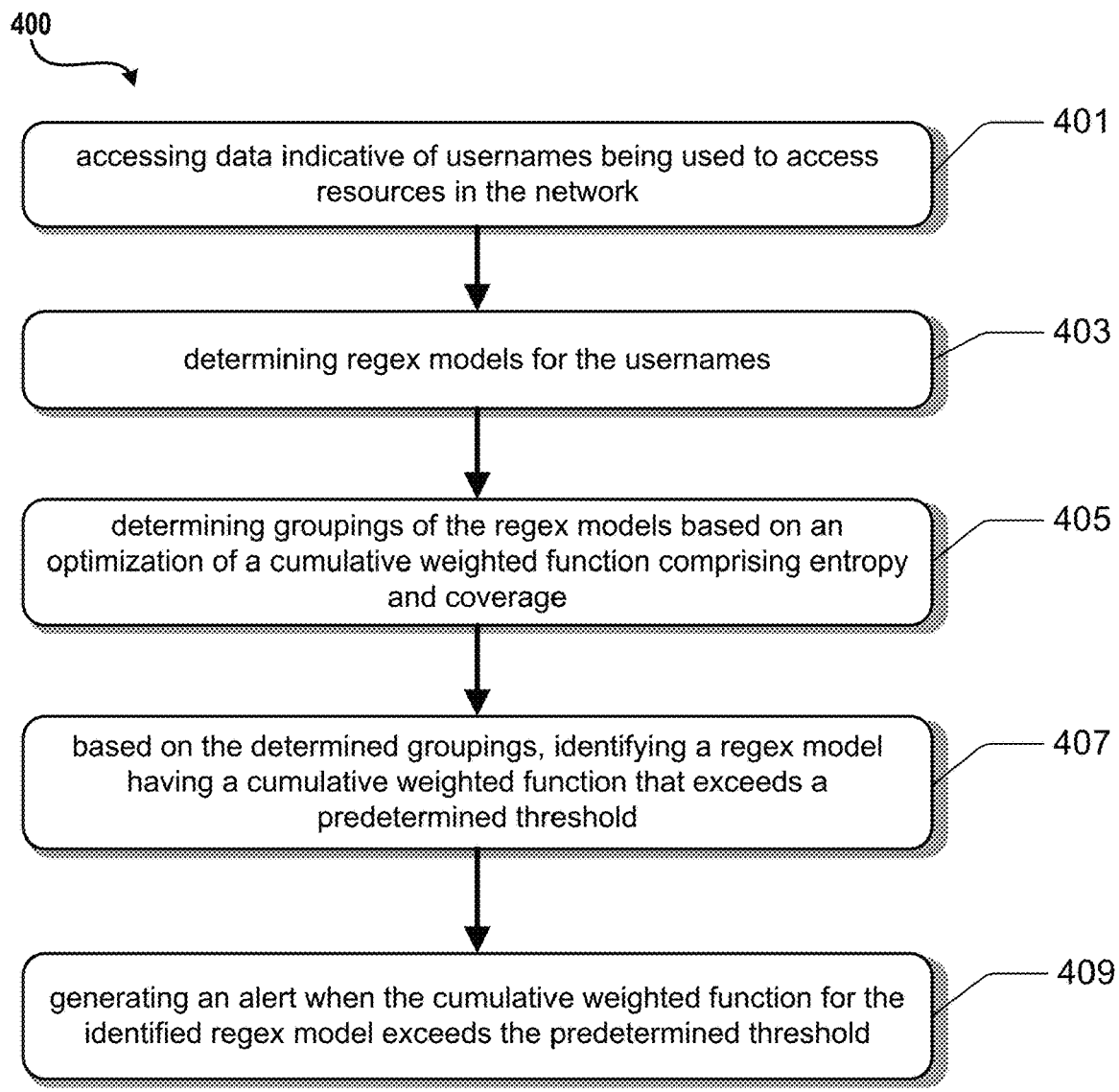
FIG. 4 is a flowchart depicting an example procedure for detecting unauthorized use of user credentials in a network implementing an authentication protocol in accordance with the present disclosure.

Turning now to FIG. 4, illustrated is an example operational procedure for detecting unauthorized credentials in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 401 illustrates accessing data indicative of usernames being used to access resources in the network.

Operation 401 may be followed by operation 403. Operation 403 illustrates determining regex models for the usernames.

Operation 403 may be followed by operation 405. Operation 405 illustrates determining groupings of the regex models based on an optimization of a cumulative weighted function comprising entropy and coverage.

Operation 405 may be followed by operation 407. Operation 407 illustrates based on the determined groupings, identifying a regex model having a cumulative weighted function that exceeds a predetermined threshold.

Operation 407 may be followed by operation 409. Operation 409 illustrates generating an alert when the cumulative weighted function for the identified regex model exceeds the predetermined threshold.

In an embodiment, the entropy is determined based on a log of a size of a character pool raised to a power of a length of a string.

In an embodiment, the coverage comprises a number of usernames covered by the regex model.

In an embodiment, the optimization is determined using an iterative tree-based approach.

In an embodiment, the coverage comprises a number of usernames covered by the regex model.

In an embodiment, a machine learning model is used to identify regex models that exceed the predetermined threshold.

In an embodiment, the groupings of the regex models are determined for a time window before generating alerts for regex models that exceed the predetermined threshold.

Figure 5:
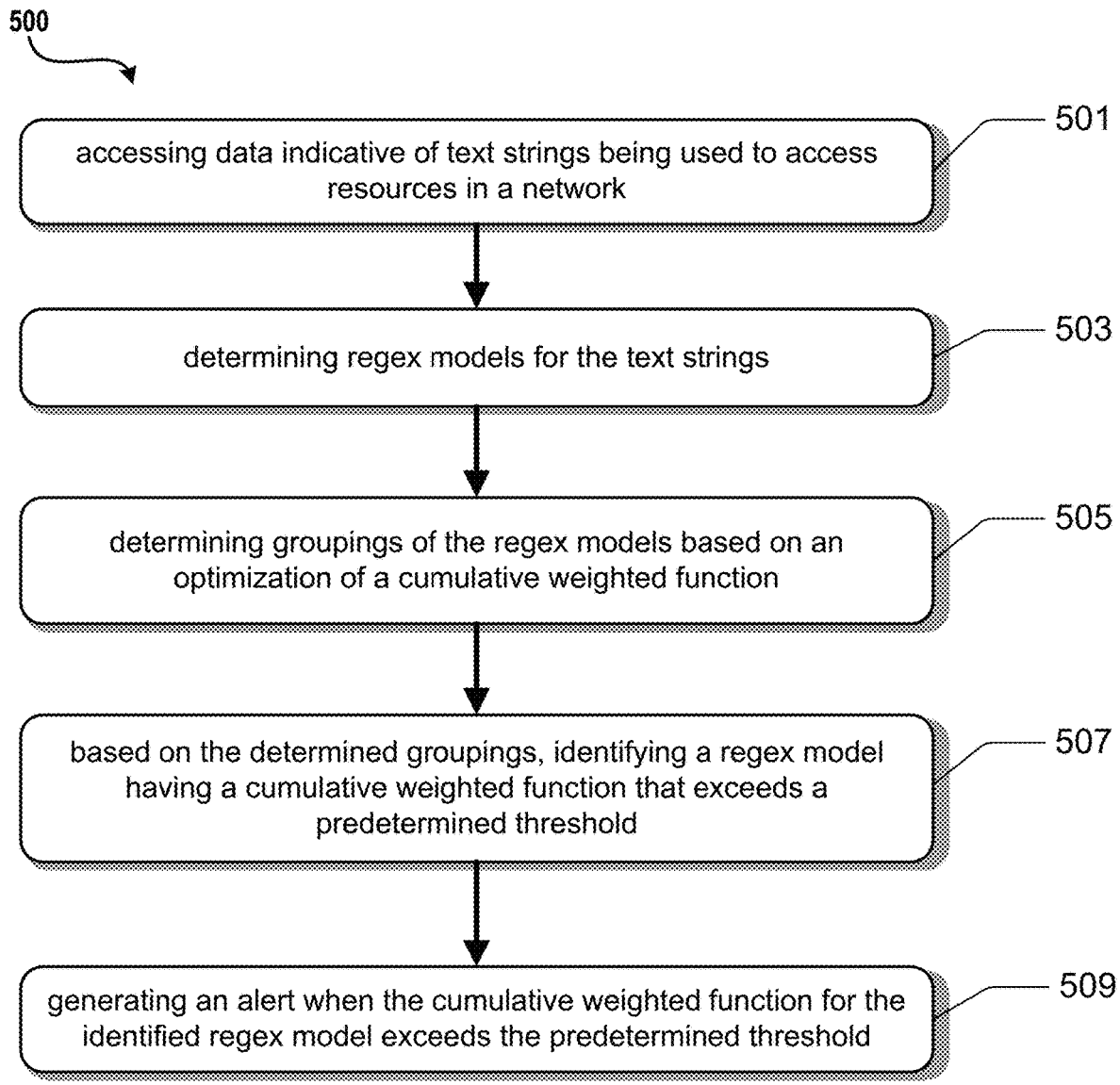
FIG. 5 is a flowchart depicting an example procedure for detecting unauthorized use of user credentials in a network implementing an authentication protocol in accordance with the present disclosure.

Turning now to FIG. 5, illustrated is an example operational procedure for detecting unauthorized use of credentials in accordance with the present disclosure. The operational procedure may be implemented in a system comprising one or more computing devices. Referring to FIG. 5, operation 501 illustrates accessing data indicative of text strings being used to access resources in a network.

Operation 501 may be followed by operation 503. Operation 503 illustrates determining regex models for the text strings.

Operation 503 may be followed by operation 505. Operation 505 illustrates determining groupings of the regex models based on an optimization of a cumulative weighted function.

Operation 505 may be followed by operation 507. Operation 507 illustrates based on the determined groupings, identifying a regex model having a cumulative weighted function that exceeds a predetermined threshold.

Operation 507 may be followed by operation 509. Operation 509 illustrates generating an alert when the cumulative weighted function for the identified regex model exceeds the predetermined threshold.

In an embodiment, the cumulative weighted function comprises entropy and coverage.

In an embodiment, the text strings comprises one or more of usernames, process identifiers, and application names.

In an embodiment, the entropy is determined based on a log of a size of a character pool raised to a power of a length of a string.

In an embodiment, the coverage comprises a number of usernames covered by the regex model.

In an embodiment, the optimization is determined using an iterative tree-based approach.

In an embodiment, a machine learning model is used to identify regex models that exceed the predetermined threshold.

In an embodiment, the groupings of the regex models are determined for a time window before generating alerts for regex models that exceed the predetermined threshold The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 300 illustrated in FIG. 3, which are configured to host physical and/or virtualized computer servers, storage devices, networking equipment and the like, that may be used to implement and distribute the infrastructure and services offered by the service provider.

Figure 6:
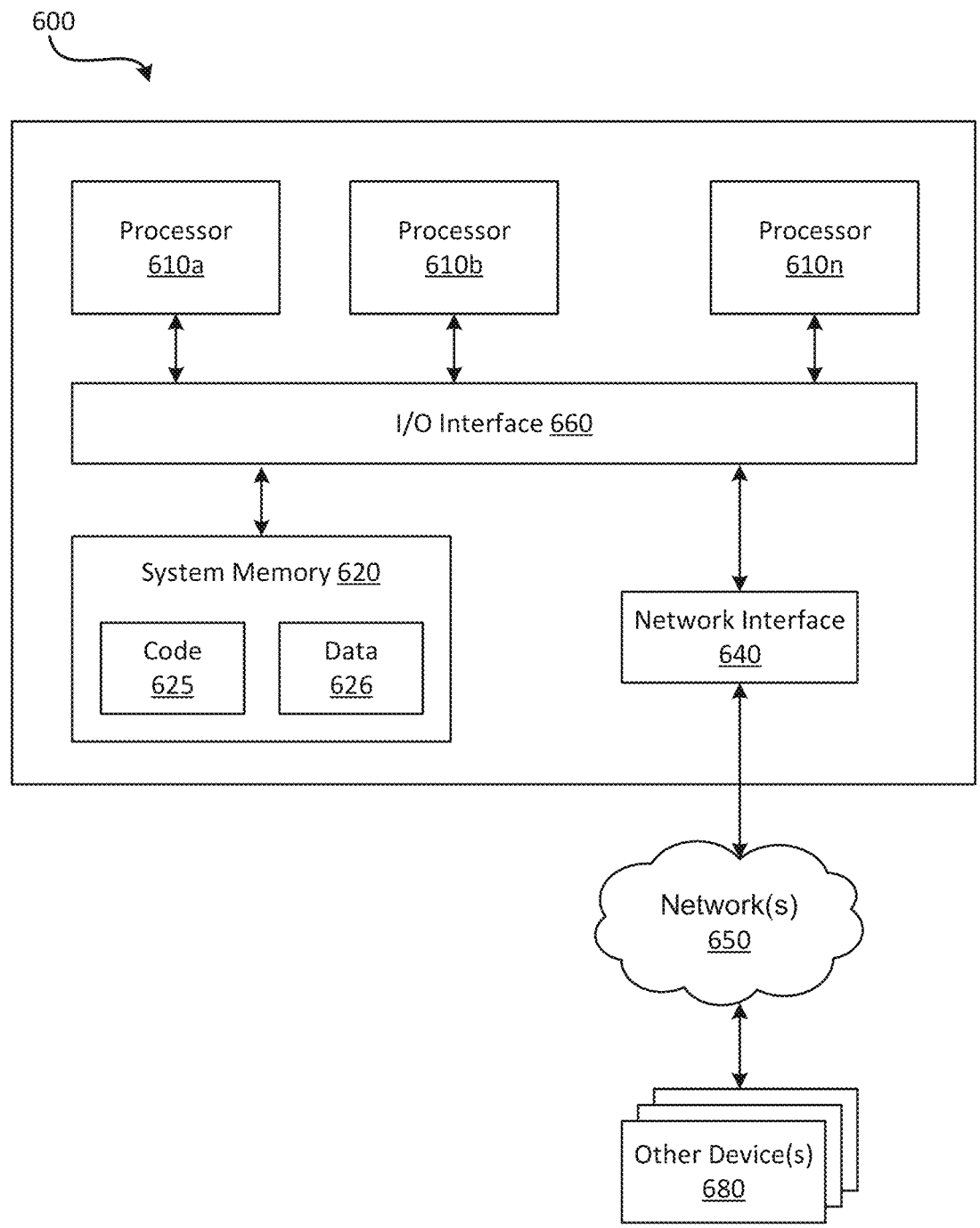
FIG. 6 is an example computing device in accordance with the present disclosure.

In some embodiments, a computing device that implements a portion or all of one or more of the technologies described herein, including the techniques to implement the detection of unauthorized use of user credentials in a network implementing an authentication protocol may include a general-purpose computer system that includes or is configured to access one or more computer-accessible media. FIG. 6 illustrates such a general-purpose computing device 600. In the illustrated embodiment, computing device 600 includes one or more processors 610*a*, 610*b*, and/or 610*n* (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the ×66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 680 attached to a network or network(s) 650, such as other computer systems or devices as illustrated in FIGS. 1 through 4, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for detecting outliers in text strings, the method comprising:
   accessing data indicative of the text strings;
   determining a set of regex models for the text strings;
   determining groupings of the text strings based on entropy and coverage of the set of regex models, the groupings based in part on a cumulative weighted function defined as a sum of weighted functions;
   based on the groupings, identifying an optimal regex model of the set of regex models corresponding to a cumulative weighted function that exceeds a predetermined threshold; and
   flagging the optimal regex model that exceeds the predetermined threshold.

2. The computer-implemented method of claim 1, wherein the entropy is determined based on a log of a size of a character pool raised to a power of a length of a string.

3. The computer-implemented method of claim 1, wherein the coverage comprises a number of text strings covered by the regex model.

4. The computer-implemented method of claim 1, wherein the identified regex model is indicative of an attempt to access resources in a computing network, the method further comprising blocking the attempt.

5. The computer-implemented method of claim 1, further comprising optimizing the cumulative weighted function by balancing between low entropy and high coverage for the determined groupings.

6. The computer-implemented method of claim 1, wherein the groupings of the set of regex models are determined for a time window before flagging regex models that exceed the predetermined threshold.

7. A computing device configured to detect outlying strings in a computing environment, the computing device comprising:
   a processor;
   a storage device coupled to the processor;
   an application stored in the storage device, wherein execution of the application by the processor configures the computing device to perform operations comprising:
   accessing data indicative of text strings;
   determining a set of regex models for the text strings;
   determining groupings of the text strings based on entropy or coverage of the set of regex models, the groupings based in part on a cumulative weighted function defined as a sum of weighted functions;
   based on the groupings, identifying an optimal regex model of the set of regex models corresponding to a cumulative weighted function that exceeds a predetermined threshold; and
   flagging the optimal regex model that exceeds the predetermined threshold.

8. The computing device of claim 7, wherein the cumulative weighted function comprises entropy and coverage.

9. The computing device of claim 7, wherein the text strings comprise one or more of usernames, process identifiers, application names, or file names, and the identified regex model is indicative of an outlier of the usernames, process identifiers, application names, or file names.

10. The computing device of claim 7, wherein the entropy is determined based on a log of a size of a character pool raised to a power of a length of a string.

11. The computing device of claim 7, wherein the coverage comprises a number of text strings covered by the optimal regex model.

12. The computing device of claim 7, the computing device is further configured to perform operations comprising optimizing the cumulative weighted function by balancing between low entropy and high coverage for the determined groupings.

13. The computing device of claim 7, further comprising using a machine learning model to identify regex models that exceed the predetermined threshold.

14. The computing device of claim 7, wherein the groupings of the regex models are determined for a time window before flagging regex models that exceed the predetermined threshold.

15. A computer-readable storage medium having stored thereon a plurality of sequences of instructions which, when executed by a processor of a computing device, cause the computing device to perform operations comprising:
  accessing data indicative of text strings;
  determining a set of regex models for the text strings;
  determining groupings of the text strings based on entropy and coverage of the set of regex models, the groupings based in part on a cumulative weighted function defined as a sum of weighted functions;
  based on the groupings, identifying a regex model of the set of regex models corresponding to a cumulative weighted function that exceeds a predetermined threshold; and
  flagging the identified regex model that exceeds the predetermined threshold.

16. The computer-readable storage medium of claim 15, further comprising instructions which, when executed by the processor, cause the computing device to perform operations comprising optimizing the cumulative weighted function by balancing between low entropy and high coverage for the determined groupings.

17. The computer-readable storage medium of claim 15, wherein the cumulative weighted function comprises entropy and coverage.

18. The computer-readable storage medium of claim 15, wherein the entropy is determined based on a log of a size of a character pool raised to a power of a length of a string.

19. The computer-readable storage medium of claim 15, wherein the coverage comprises a number of text strings covered by the identified regex model.

20. The computer-readable storage medium of claim 15, wherein the text strings are indicative of names, and the identified regex model is associated with an outlier of the names.

* * * * *